United States Patent [19]

Miyake

[11] Patent Number: 4,633,112
[45] Date of Patent: Dec. 30, 1986

[54] FLAT ELECTRIC MOTOR WITH ADJUSTABLE BEARING SUPPORT

[75] Inventor: Shiyuichi Miyake, Sano, Japan

[73] Assignee: Nihon Radiator Co., Ltd., Japan

[21] Appl. No.: 748,351

[22] Filed: Jun. 24, 1985

[30] Foreign Application Priority Data

Jun. 26, 1984 [JP] Japan .............................. 59-94588[U]
Jun. 29, 1984 [JP] Japan .............................. 59-96760[U]

[51] Int. Cl.⁴ .......................... H02K 5/16; H02K 7/08
[52] U.S. Cl. ...................................... 310/90; 384/192
[58] Field of Search ........................... 310/90, 91, 268; 384/192, 215, 220, 222, 247, 393, 249, 252, 260, 261

[56] References Cited

U.S. PATENT DOCUMENTS

| | | | |
|---|---|---|---|
| 1,731,958 | 10/1929 | Wickstrom | 384/220 |
| 2,184,532 | 12/1939 | Schroeder | 384/252 |
| 2,985,493 | 5/1961 | Dinsmore | 384/249 |
| 3,037,822 | 6/1962 | Plummer | 310/90 X |
| 3,227,001 | 1/1966 | Reese | 384/215 |
| 3,544,822 | 8/1968 | Pickles | 310/268 |
| 4,336,969 | 6/1982 | Kahlert et al. | 384/247 |

FOREIGN PATENT DOCUMENTS 1013469 8/1957 Fed. Rep. of Germany ........ 310/90

Primary Examiner—Patrick R. Salce
Assistant Examiner—D. L. Rebsch
Attorney, Agent, or Firm—Leydig, Voit & Mayer

[57] ABSTRACT

An improved flat electric motor comprising a casing and a drive shaft passing through the casing and rotatable about the axis thereof relative to the casing. An armature unit having a commutator is mounted on the drive shaft to rotate therewith, with electric brushes in contact with the commutator to provide electric connection therebetween. Two annular bearings are connected to the casing to bear two axially spaced portions of the drive shaft, one of the annular bearings having a resiliently mounted support to adjust the position of the selected bearing relative to the casing. The mounted support includes a bearing holder, a resilient spacer, and threaded bolts compressing the resilient spacer for adjusting the location of the support.

11 Claims, 4 Drawing Figures

FLAT ELECTRIC MOTOR WITH ADJUSTABLE BEARING SUPPORT

BACKGROUND OF THE INVENTION

The present invention relates in general to an electric motor and more particularly to a flat electric motor which is particularly usable as a fan-motor installed in a motor vehicle.

Hitherto, various kinds of electric motors have been proposed and put into practical use as a so-called "fan motor" installed in a motor vehicle. Some of them are of a flat type electric motor which is constructed to have a reduced dimension in the axial direction thereof, in order to effectively use a limited space in the vehicle in which the motor is installed. However, some of the hitherto proposed flat electric motors have suffered from several drawbacks due to their inherent constructions. One of the conventional flat electric motors will be outlined hereinafter in order to clarify the drawbacks to be eliminated by the present invention.

SUMMARY OF THE INVENTION

Therefore, it is an essential object of the present invention to provide an improved flat electric motor which can eliminate the drawbacks encountered in the conventional flat electric motor.

According to the present invention, there is provided an electric motor which comprises a casing; a drive shaft passing through the casing and rotatable about the axis thereof relative to the casing; an armature unit mounted on the drive shaft to rotate therewith; a commutator attached to the armature unit; electric brushes arranged in slidable contact with the commutator to provide electric connection therebetween; two bearing units which are supported by the casing to bear two axially spaced portions of the drive shaft; a resiliently mounted support for one of the two bearing units to adjust the position of the selected bearing unit relative to the casing and an adjustable fastening means for adjusting the location of the support.

BREIF DESCRIPTION OF THE DRAWINGS

Other objects and advantages of the present invention will become apparent from the following description when taken in conjunction with the accompanying drawings, in which.

DESCRIPTION OF A CONVENTIONAL FLAT ELECTRIC MOTOR

Prior to describing in detail the present invention, one conventional flat electric motor will be described with reference to FIG. 4 in order to clarify the drawbacks thereof which are to be eliminated by the present invention.

Figure 4:
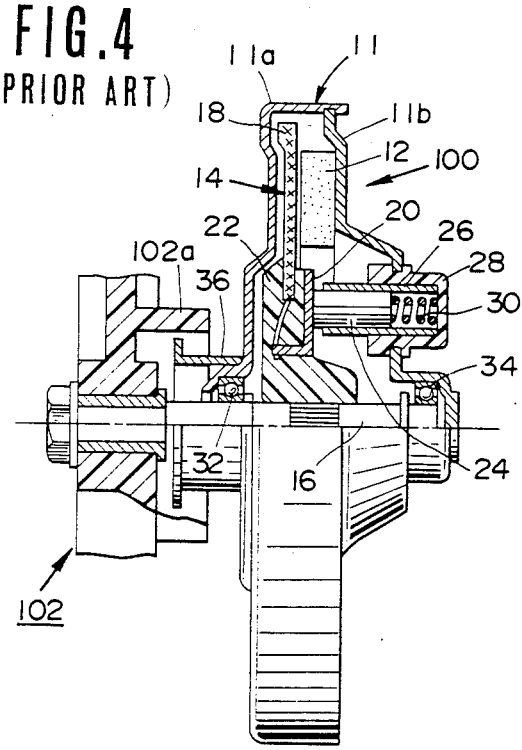
FIG. 4 is a vertically sectional view of a conventional flat electric motor with a fan connected thereto.

Referring to FIG. 4, there is shown, in a sectional fashion, a conventional flat electric motor 100 having a fan 102 connected thereto.

The electric motor 100 comprises an annular body 11a and a circular lid 11b which are assembled together to form a flat annular casing 11. Within the casing 11, there is disposed an annular permanent magnet 12 which is secured to the circular lid 11b in a manner to be concentric therewith. Within the casing 11, there is also arranged a flat rotor 14 which is coaxially and securely mounted on a drive shaft 16 to rotate therewith about the axis thereof. The rotor 14 comprises a discal armature 18 and a discal commutator 20 which are coaxially mounted on a plastic hub member 22 splined to the drive shaft 16. A pair of electric brushes 24 (only one is shown in the drawing) are arranged to be in slidable contact with the commutator 20 to provide electric connection therebetween. Each brush 24 is slidably received in a sleeve 26 which is held by a rubber holder 28 detachably fixed to the circular lid 11b. A spring 30 is disposed in the sleeve 26 to bias the brush 24 toward the commutator 20. A pair of spaced ball bearings 32 and 34 are interposed between the drive shaft 16 and the central portions of the casing 11 to provide smooth rotation of the drive shaft 16 relative to the casing 11. As shown, each ball bearing 32 or 34 is received in a swelled portion (no numeral) formed at the central area of the casing 11a or 11b. Securely disposed about the swelled portion of the annular body 11a of the casing 11 is a collar member 36 which extends toward the fan 102 and has a radially outwardly extending flange (no numeral) at its leading end.

The fan 102 is bolted to the drive shaft 16 to be driven by the same. The fan 102 is formed with an annular wall 102a which spacedly receives therein the flanged end of the collar member 36 of the motor 100, so that they constitute a so-called "water stopper" by which the interior of the motor casing 11 is protected from penetration of water (such as, rain drops or the like) thereinto.

DRAWBACKS ENCOUNTERED IN THE CONVENTIONAL MOTOR

However, due to its inherent construction, the above-mentioned conventional flat electric motor 100 has the following drawbacks.

First, because the drive shaft 16 is held in the casing 11 by means of the ball bearings 32 and 34, very severe dimensional consideration is needed for assembling the casing 11. That is, if the drive shaft 16 is arranged out of centering relative to the casing 11 due to improper arrangement of the ball bearings 32 and 34, the positional relationship between the discal armature 18 and the annular permanent magnet 12 is greatly deteriorated, severely affecting the performance of the motor 100. This should be carefully considered because the distance between the magnet 12 and the discal armature 18 has direct effect on the performance of the motor 100. Furthermore, if the ball bearings 32 and 34 are arranged out of centering relative to the drive shaft 16, undesirable shaft seizure tends to occur.

Second, in general, the ball bearings 32 and 34 have a tendency of producing a considerable noise, particularly after long use thereof. Thus, usage of the electric motor 100 with the ball bearings 32 and 34 in a motor vehicle may cause noise in a passenger cabin.

Third, it is difficult to replace the worn-out bearings 32 and 34 with new ones because they are held in the casing 11.

Fourth, usage of the separate collar member 36 in construction of the "water stopper" induces increase in number of parts, and increase in cost of the motor 100.

DETAILED DESCRIPTION OF THE INVENTION

Figure 1:
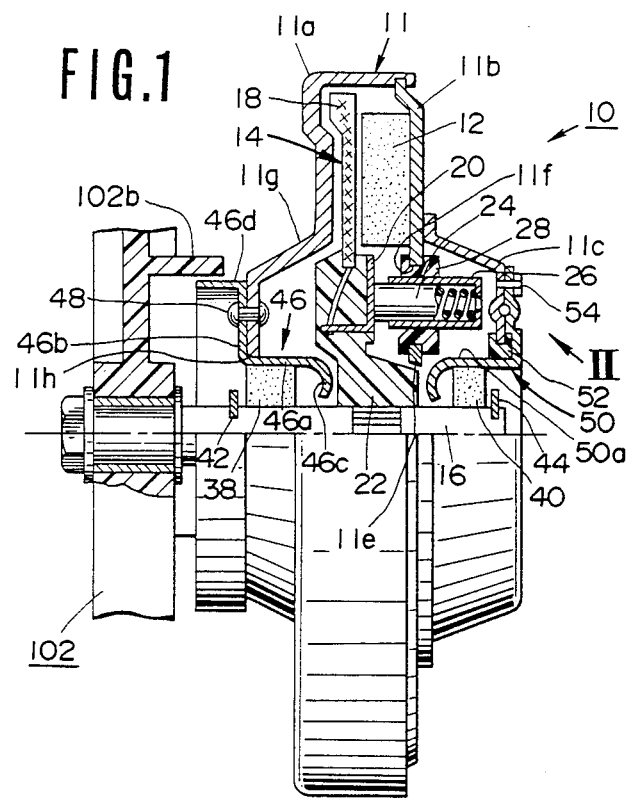
FIG. 1 is a vertically sectional view of a flat electric motor according to the present invention, the motor being shown with a fan connected thereto.
Figure 2:
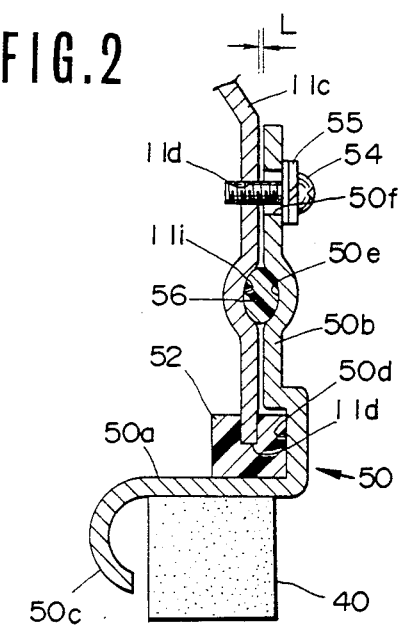
FIG. 2 is an enlarged sectional view of an essential part of the motor, which is indicated by the arrow "II" in FIG. 1.
Figure 3:
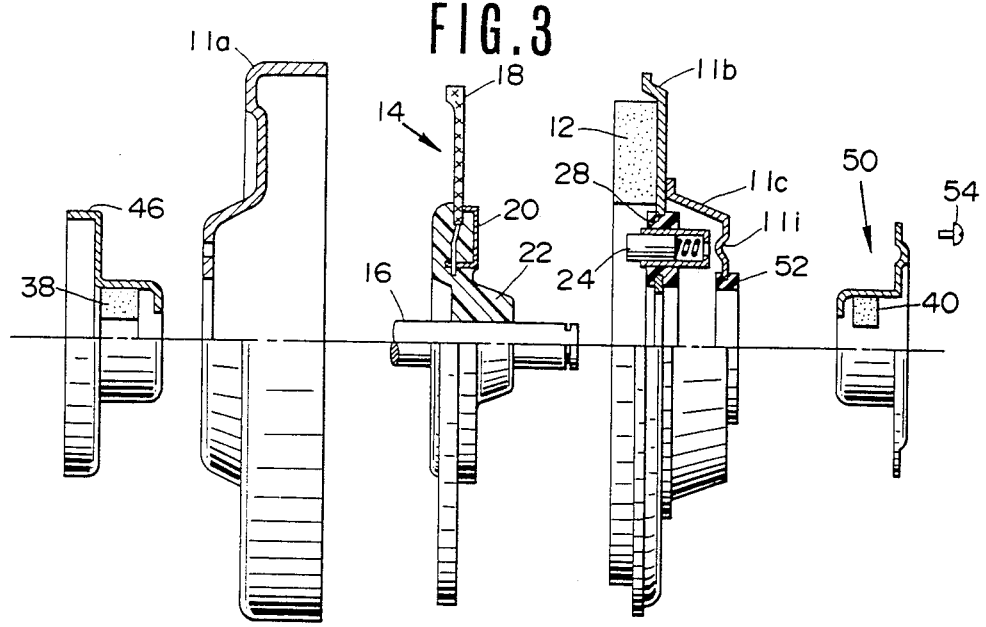
FIG. 3 is an exploded and sectional view of the electric motor of the invention.

Referring to FIGS. 1 to 3, particularly FIG. 1, there is shown an improved flat electric motor 10 which can solve the above-mentioned drawbacks. For convenience, substantially the same parts as those in the above-mentioned conventional motor 100 are designated by the same numerals, and detailed description of them will be omitted from the following.

The flat electric motor 10 of the present invention comprises an annular body 11a and a circular lid 11b which are assembled together to form a flat annular casing 11. A cup-shaped cover 11c is secured to the outer surface of the circular lid 11 in a manner to be concentric with the casing 11. The circular bottom wall of the cover 11c is formed at its central portion with a circular opening (see FIG. 2) for the purpose which will become clear hereinafter. The circular lid 11b of the casing 11 is also formed at its central portion with a circular opening 11e and at portions distant from the central opening 11d with two circular openings 11f (only one is shown in the drawings). The annular body 11a of the casing 11 has a swelled central portion 11g which is formed at its central portion with a circular opening 11h.

Within the casing 11, there is disposed an annular permanent magnet 12 which is secured to the circular lid 11b. Within the casing 11, there is also arranged a flat rotor 14 which is mounted on a drive shaft 16 to rotate therewith. The rotor 14 comprises a discal armature 18 and a discal commutator 20 which are disposed on a plastic hub member 22 splined to the drive shaft 16. As shown, the hub member 22 has a frusto-conical portion (no numeral) which is spacedly received in the central opening 11e of the circular lid 11b.

A pair of electric brushes 24 (only one is shown in the drawings) are arranged in the casing 11 in a manner to slidably contact with the commutator 20 to provide electric connection therebetween. Each brush 24 is slidably received in a sleeve 26 which is held by a rubber holder 28 detachably put in the circular opening 11f of the circular lid 11b of the casing 11. A coil spring 30 is disposed in each of the sleeves 26 to bias the corresponding brush 24 toward the commutator 20. As shown, each sleeve 26 is projected into the interior of the cup-shaped cover 11c.

In the flat electric motor 10 according to the present invention, bearings 38 and 40 constructed of lubricant oil-impregnated sintered metal are employed for rotatably supporting the drive shaft 16 to the casing 11. As is seen from FIG. 1, the bearings 38 and 40 are of annular shape and disposed about the drive shaft 16 in a manner to be axially spaced from each other. As will become clear hereinafter, the bearings 38 and 40 are tightly thrusted in respective annular holders 46 and 50 which are secured to the casing 11. The drive shaft 16 has thereon two stopper rings 42 and 44 which are positioned outside of the bearings 38 and 40. Thus, the axial movement of the drive shaft 16 relative to the casing 11 is limited by engagement of the rings 42 and 44 with the corresponding fixed bearings 38 and 40. Upon rotation of the drive shaft 16, the lubricant oil impregnated in the sintered metal bearings 38 and 40 is forced to ooze out, smoothly lubricating the mutually contacting surfaces of the drive shaft 16 and the bearings 38 and 40.

As is mentioned hereinabove, the bearing 38 is held by the annular holder 46 which is bolted to the annular body 11a of the casing 11. That is, the annular holder 46 is constructed of a resilient metal sheet and comprises a cylindrical portion 46a which is received in the central circular opening 11h of the annular body 11a of the casing 11 and snugly receives therein the bearing 38, an annular plate portion 46b which radially outwardly extends from the cylindrical portion 46a and is secured to the annular body 11a by means of bolts 48 (only one is shown), and an apertured bottom portion 46c through which the drive shaft 16 is spacedly passed. As shown, the apertured central area of the bottom portion 46c is raised toward the interior of the cylindrical portion 46a. By the provision of the bottom portion 46c, the lubricant oil scattering from the bearing 38 upon rotation of the drive shaft 16 is prevented from contacting the rotor 14.

The annular holder 46 is further provided with an integral collar portion 46d which coaxially extends outwardly from the periphery of the annular plate portion 46b. The collar portion 46d is spacedly received in an annular wall 102b of a fan 102 in a manner to define therebetween a thin annular space, as shown. The collar portion 46d and the annular wall 102b constitute a so-called "water stopper" as explained hereinafter.

The other bearing 40 is held by another annular holder 50 secured to the cup-shaped cover 11c of the casing 11. As is best seen from FIG. 2, the annular holder 50 comprises a cylindrical portion 50a which is received in the circular opening 11d of the cup-shaped cover 11c with interpositioning of an annular rubber bush 52 therebetween and receives therein the bearing 40, an annular plate portion 50b which radially outwardly extends from the cylindrical portion 50a and is secured to the cover 11c by means of threaded bolts 54 (only one is shown), and an apertured bottom portion 50c through which the drive shaft 16 is spacedly passed. Each bolt 54 passes through a larger diameter opening 50f formed in the annular plate portion 50b of the holder 50 and operatively engaged with a threaded opening 11d formed in the cup-shaped cover 11c. For assuring the connecting function of the bolts 54, a spring washer 55 is fitted to each bolt 54. Similar to the afore-mentioned holder 46, the apertured central area of the bottom portion 50c is raised toward the interior of the cylindrical portion 50a. By the provision of the bottom portion 46c, the lubricant oil scattering from the bearing 40 is prevented from contacting the rotor 14.

The annular holder 50 has at the annular plate portion 50b an annular recess 50d into which the annular rubber bush 52 is coaxially and partially received. The holder 50 is further formed at the annular plate portion 50b with an annular groove 50e which extends on the portion 50b about the axis of the holder 50. The cup-shaped cover 11c is formed, at the portion facing the annular groove 50e of the bearing holder 50, with an annular groove 11i which extends coaxial with the annular groove 50e of the holder 50. As is seen from FIG. 2, each annular groove 50e or 11i has a generally semicircular cross section. A rubber ring 56 having a circular cross section (in unstressed condition) is disposed and compressed between the mutually facing annular grooves 50e and 11i to define a considerable clearance "L" between the cover 10c and the annular plate portion 50b. With the rubber rings 56 and 52, water-tight connection between the bearing holder 50 and the cup-shaped cover 11c is assured.

It is now to be noted that, by the provision of the clearance "L", the position of the holder 50 relative to the fixed cup-shaped cover 11c can be adjusted by suitably manipulating the bolts 54. This induces easy centering of the bearing holder 50 relative to the cup-shaped cover 11c. That is to say, even if the electric motor 10 is assembled with the drive shaft 16 arranged out of centering relative to the casing 11 due to, for example, unavoidable dimensional errors in making the parts thereof, the centering of the drive shaft 16 to the casing 11 can be easily carried out thereafter.

In the following, the assembling process of the electric motor 10 of the invention will be outlined with reference to FIG. 3.

First, the bearing 38 is tightly thrust into the annular holder 46, the holder 46 is bolted to the annular body 11a of the casing 11, and the subassembled rotor 14 is put into the annular body 11a having the drive shaft 16 slidably received in the bearing 38 of the holder 46. Then, the lid assembly including the circular lid 11b, the annular permanent magnet 12, the cup-shaped cover 11c and the brush assemblies (24,30,26 and 28) are fixed to the annular body 11a having the periphery of the circular lid 11b caulked to the periphery of the annular body 11a. Thereafter, the other annular holder 50 containing therein the bearing 40 is fixed to the cup-shaped cover 11c by means of the adjusting bolts 54. Thus, the assembly of the motor 10 is easily carried out without need for any troublesome work.

As will be understood from the above description, in the flat electric motor 10 according to the present invention, the centering of the drive shaft 16 relative to the casing 11 can be easily achieved by only manipulating the adjusting bolts 54. This adjusting work can be carried out after assembly of the motor 10 from the outside of the same. Thus, the afore-mentioned drawbacks encountered in the conventional flat motor 100 of FIG. 4 are solved in the present invention. That is, the undesirable shaft seizure does not occur. Usage of the lubricant oil-impregnated sintered metal bearings has achieved quiet and secure bearing function. Furthermore, replacement of a worn-out bearing 40 with new one is easily carried out by only dismantling the bearing holder 50 from the casing 11c, and the motor 10 can be assembled with simple steps as is explained hereinabove.

What is claimed is:

1. An electric motor comprising:
    a casing;
    a drive shaft passing through said casing and rotatable about the axis thereof relative to said casing;
    an armature unit mounted on said drive shaft to rotate therewith;
    a commutator attached to said armature unit to move therewith;
    electric brushes arranged in slidable contact with said commutator to provide electric connection therebetween;
    two annular bearings which are connected to said casing to bear two axially spaced portions of said drive shaft; and
    a resiliently mounted support for one of said annular bearings and an adjustable fastening means for adjusting the location of said support to adjust the position of said one bearing relative to said casing.

2. An electric motor as claimed in claim 1 in which each of said bearings is constructed of sintered metal and impregnated with lubricant oil.

3. An electric motor as claimed in claim 2 in which said adjustable fastening means is arranged to move said selected bearing in both axial and radially outward directions with respect to the axis of said casing.

4. An electric motor as claimed in claim 3 in which said resiliently mounted support comprises:
    a bearing holder including a holder proper which holds the selected bearing and an extension portion which has openings formed therethrough;
    a resilient spacer interposed between said extension portion and an outside surface of said casing; and
    said adjustable fastening means includes:
    threaded bolts spacedly passing through the openings of the extension portion of said bearing holder and operatively engaged with threaded openings formed in said casing in a manner to compress said resilient spacer while retaining a considerable space between said extension portion and said outside surface of said casing.

5. An electric motor comprising:
    a casing;
    a drive shaft passing through said casing and rotatable about the axis thereof relative to said casing;
    an armature unit mounted on said drive shaft to rotate therewith;
    a commutator attached to said armature unit to move therewith;
    electric brushes arranged in slidable contact with said commutator to provide electric connection therebetween;
    two annular bearings connected to said casing to bear two axially spaced portions of said drive shaft, each of said bearings being constructed of sintered metal and impregnated with lubricant oil; and
    a resiliently mounted support for one of said annular bearings arranged to move said one bearing in both axial and radially outward directions with respect to the axis of said casing, said resiliently mounted support having a bearing holder including a holder which holds the selected bearing and an extension portion which has openings formed therethrough;
    a resilient spacer interposed between said extension portion and an outside surface of said casing; and
    an adjustable fastening means for adjusting the location of said resiliently mounted support and including threaded bolts spacedly passing through the openings of the extension portion of said bearing holder and operatively engaged with threaded openings formed in said casing in a manner to compress said resilient spacer while retaining a considerable space between said extension portion and said outside surface of said casing,
    said bearing holder being an annular member which comprises a cylindrical portion serving as said holder, and a annular plate portion which radially outwardly extends from said cylindrical portion to serve as said extension portion, said opening of said bearing holder being arranged at said annular plate portion in a manner to surround the center of said annular plate portion.

6. An electric motor as claimed in claim 5, in which said cylindrical portion of said bearing holder is coaxially disposed in a circular opening formed in said casing so that said cylindrical portion is projected into the interior of said casing.

7. An electric motor as claimed in claim 6 in which said resilient spacer comprises a rubber ring which is disposed between said annular plate portion of said bearing holder and the outside surface of said casing in a manner to surround the center of said annular plate portion.

8. An electric motor as claimed in claim 7 in which said rubber ring is put in and interposed between mutually facing annular grooves which are respectively formed on said annular plate portion of said bearing holder and the outside surface of said casing.

9. An electric motor as claimed in claim 8 in which said resilient spacer further comprises another rubber ring which is interposed between the cylindrical portion of said bearing holder and the peripheral edge of said circular edge of said circular opening of said casing.

10. An electric motor as claimed in claim 9 in which said cylindrical portion of said bearing holder is integrally formed with an apertured bottom portion through which said drive shaft is spacedly passed.

11. An electric motor as claimed in claim 10 in which said bottom portion of said bearing holder is raised toward the interior of said cylindrical portion.

* * * * *